United States Patent [19]

Ancelle

[11] Patent Number: 4,705,121
[45] Date of Patent: Nov. 10, 1987

[54] PIN, ESPECIALLY FOR CLAMPING A SLEEVE-SHAPED PROTECTOR OR CENTERING DEVICE ON ITS TUBE SERVING FOR DRILLING AN UNDERGROUND DEPOSIT

[75] Inventor: Eric J. Ancelle, Neuilly sur Seine, France

[73] Assignee: BECAP, Pantin, France

[21] Appl. No.: 813,858

[22] Filed: Dec. 19, 1985

[30] Foreign Application Priority Data

Dec. 20, 1985 [FR] France ................................ 84 19602

[51] Int. Cl.⁴ ............................................ E21B 17/10
[52] U.S. Cl. .................................... 175/325; 166/243; 403/408.1
[58] Field of Search ................. 175/325, 323; 166/243, 166/242; 403/13, 14, 364, 408; 24/20 R, 265 C, 336, 339

[56] References Cited

U.S. PATENT DOCUMENTS

| | | | |
|---|---|---|---|
| 2,252,978 | 8/1941 | Parkin | 175/325 |
| 3,054,646 | 9/1962 | Minor | 175/325 |
| 3,425,757 | 2/1969 | Minor | 175/325 |
| 3,484,141 | 12/1969 | Collett | 175/325 |
| 3,893,778 | 7/1975 | Williams | 175/325 |
| 3,894,779 | 7/1975 | Hoon et al. | 175/325 |
| 3,894,780 | 7/1975 | Broussard | 175/325 |
| 4,042,023 | 8/1977 | Fox | 175/325 |

Primary Examiner—James A. Leppink
Assistant Examiner—Terry Lee Melius
Attorney, Agent, or Firm—William H. Hinds

[57] ABSTRACT

Invention relates to a pin for clamping a sleeve 1 moulded from rubber and having a crenellated cut, of which the teeth 7 and spaces 8 match one another, so that the sleeve can be closed over a tube to be protected, the said sleeve being of the type with an embedded metal carcass 6 and terminating with a loop 13 in each tooth 7.

The pin 10 which makes it possible to clamp the sleeve by penetrating all the loops of the carcass is of a type with a trapezoidal shank and is characterized in that the point of its shank has a gland 22, and in that the edges of the shank on and at the rear of the gland are rounded and polished.

The invention can be used particularly for clamping protectors serving for drilling or production in an underground deposit.

8 Claims, 6 Drawing Figures

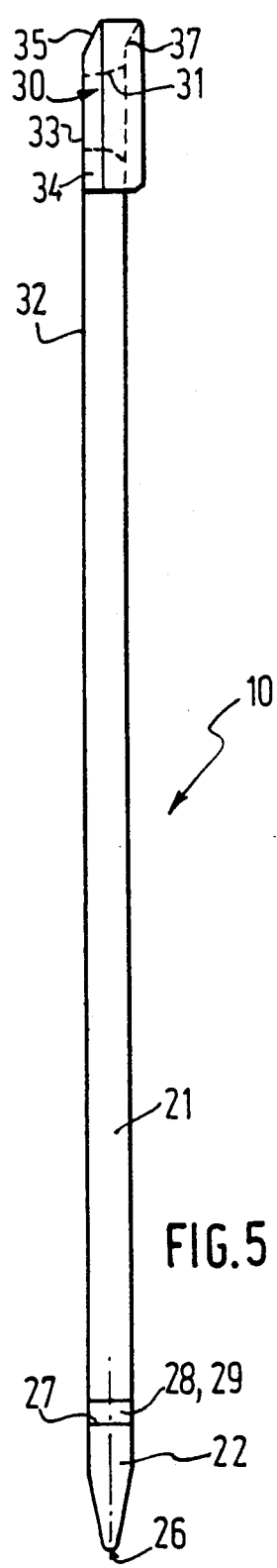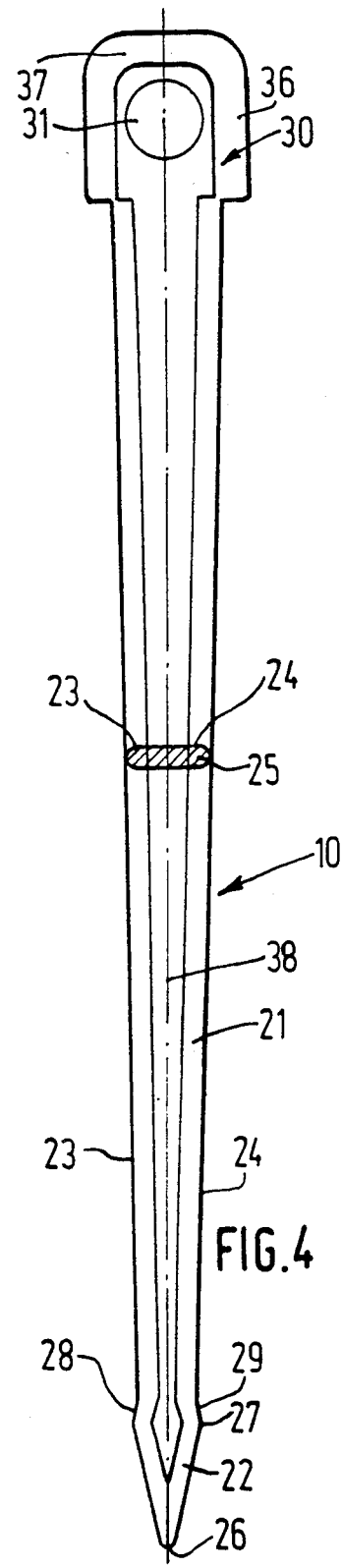

PIN, ESPECIALLY FOR CLAMPING A SLEEVE-SHAPED PROTECTOR OR CENTERING DEVICE ON ITS TUBE SERVING FOR DRILLING AN UNDERGROUND DEPOSIT

DESCRIPTION

Pin, especially for clamping a sleeve-shaped protector or centreing device on its tube serving for drilling an underground deposit.

The invention relates to a pin, particularly a pin for clamping a sleeve-shaped protector or centreing device on its tube serving for drilling or production in an underground deposit. By drilling and production in an underground deposit are meant, here, all the operations making it possible to bore out generally vertical wells, either to extract deposits of petroleum or natural gas or to search for deep bodies of water or to inject gases into porous and permeable formations to provide underground storage facilities.

It is known that, in a deep-drilling operation, the well is obtained as a result of different successive drilling phases, between which the hole is lined with a column of concentric steel tubes, the diameters of which decrease from the surface towards the bottom of the hole.

The operations of drilling at the depth are now carried out by means of a drill bit driven in rotation by hollow drill rods screwed to one another up to the surface of the ground, where the rotation of the last rod is controlled by a rotary table located at the base of a derrick.

The lowest drill rods, that is to say those arranged immediately above the drill bit, are very thick tubes called "messetiges", exerting forces of the order of 100 to 300 daN/meter.

After a first surface drilling, the walls of the well are lined by lowering a column of concentric steel tubes or "casings" which will form a liner intended for holding back the earth.

From place to place, each casing is centred in the ground and/or in the upper casing by means of rubber sleeves with outer longitudinal sides. It is necessary to have longitudinal straight sides on the outer wall of the centreing devices of each casing, simply because the column of casings, after being installed in the hole, is cemented over all or some of its height by means of a cement slurry injected from the bottom of the hole into the annular space located between the column and the wall of the hole.

When drilling starts again, to advance the drilling of the well further and install the technical column or production column, it is then appropriate to protect the new drill rod within the surface liner. This protection is obtained by means of rubber sleeves arranged likewise from place to place along the drill rod, usually in line with the special threads which, every nine to twelve metres, join together with the various high-strength steel tubes forming the said drill rod. The outer wall of these protectors is either smooth or with helical ribs.

During or at the end of drilling, it sometimes proves necessary to supply electricity to the appliances at the bottom, for example pumps. The electrical supply cables are themselves protected by rubber sleeves, the outer wall of which is either smooth or with helical ribs or with longitudinal straight ribs.

All the sleeves mentioned above, whether they serve for centreing a casing or for protecting the drill rod or the supply cables, have their shape and construction in common.

In fact, each sleeve has, over its entire height, a crenellated cut, of which the teeth and spaces facing one another alternately on the two edges of the cut, match one another so that, as result of the interpenetration of the teeth in the spaces, the sleeve can be closed and clamped elastically over the tube to be centred or to be protected. In other words, the inside diameter of the closed sleeve is necessarily slightly less than the diameter of the tube, over which it is to be fitted, so that, as result of the elasticity, it grips the tube in order to perform its centreing and protection function permanently. In contrast to this, the outside diameter of the sleeve is stipulated simply by the book of specifications and also depends on whether the sleeve has ribs or not on the outside.

At the customer's request, and depending on the conditions of use, the sleeve is made of natural or synthetic rubber. In all cases, however, it incorporates a metal carcass embedded in the thickness and bonded in the rubber mass at the time of moulding.

Each sleeve is clamped by means of a pin which passes through all the interpenetrating teeth via orifices extending over the entire height of each tooth parallel to the axis of the sleeve and to the general direction of the cut.

In view of the forces which the sleeve must withstand, the construction is such that the metal carcass terminates, in each tooth, in a loop which extends over the entire height of the tooth and the aperture of which is likewise parallel to the axis of the sleeve.

For this purpose, the carcass can be produced from a metal sheet or from a fine-mesh metal netting, the width of which is slightly less than the height of the sleeve to be produced, the said carcass being folded on itself along its two short sides and riveted to form the two loops desired. Before or after the folding and riveting of the sheet or netting forming the carcass, the latter is sheared in line with the spaces present on the two edges of the cut, so as to match the crenellated profiles of the edges of the cut after the moulding of the sleeve. Alternatively, the carcass can be produced from a metal sheet of less length, to each of the two short sides of which is attached, by means of welds or rivets, a piece called a clasp, which already has the desired loop shape. These clasps are usually made of a softer steel than the sheet, to the ends of which they are fastened, to make it easier to shape them. These two clasps are likewise sheared in line with the spaces present on the two edges of the cut, so as to match the crenellated profile of the corresponding edge of the cut, at each loop.

Because of the construction described above, all the teeth formed on the two edges of the crenellated cut are reinforced by means of a loop of the carcass, but are hollow within this loop, to allow the closing pin to pass through by penetrating all the teeth located alternately along the cut, once the edges of the latter are brought close to one another.

The pins used at the present time are either cylindrical or frustoconical rods or rods cut out in a slightly trapezoidal shape from thick sheet metal. Where frustoconical or trapezoidal pins are concerned, it is clear that the loops of the carcass have dimensions which decrease from the top downwards with an inclination equal to that of the pin. For this purpose, the slots cut out in the edges of the sheet or in the clasps have the form of arrow heads, and the sheet or the clasps are folded along lines inclined slightly from top to bottom, towards the centre of the carcass in relation to the general direction of the cut.

A requirement of all these pins is that they should withstand clamping values of approximately four metric tons. Because of the corresponding difficulty of penetration, it is difficult for conventional pins to clamp the sleeves perfectly on the tubes to be protected or centred.

To overcome this difficulty of penetration, one idea has been to preclamp the sleeve by means of a plier device engaging directly on a modified carcass. In fact, to allow the pliers to be attached, the carcass has to be modified, either by fitting a suitable additional piece on each rivet head closing the loops of the carcass or securing the clasps to the sheet or by producing a slight protuberance on the carcass itself.

As result of the preclamping by means of pliers engaging directly on a carcass modified in this way, it is possible to ensure sufficient clamping of the sleeve with easy penetration of the pin, for example by blows of a mallet or hammer.

Although the advantage of such a modification of the carcass is that it makes it possible to achieve a better and, above all, easier clamping of the sleeve on its tube, it is nevertheless clear that it has two disadvantages; the first is that it considerably increases the cost price of the sleeve, and the second is that it makes it necessary for the sleeve fitters to carry out an additional preclamping operation.

The object of the present invention is to overcome the abovementioned disadvantages, and with this in view it proposes a pin construction of such a geometry that it allows easy penetration into all the loops of the carcass, without the need to modify the latter or carry out a preclamping operation.

The subject of the present invention is, therefore, a pin, especially for clamping a sleeve-shaped protector on its tube serving for drilling or production in an underground deposit, the said sleeve being made of moulded rubber and having, over its entire height, a crenellated cut, of which the teeth and spaces facing one another alternately on the two edges of the cut match one another so that, as result of the inter-penetration of the teeth in the spaces, the sleeve can be closed and clamped on the tube to be protected or centred, the said sleeve being of the type with an embedded metal carcass which terminates, in each tooth of the sleeve, in a loop which extends over the entire height of the tooth and the aperture of which is parallel to the axis of the sleeve and to the general direction of the cut, and the pin, to clamp the sleeve by penetrating all the loops of the carcass which are present on the two edges of the sleeve brought close to one another, being of the type with a trapezoidal shank and being characterized in that the point of the shank has a gland, and in that the edges of the shank on and at the rear of the gland are rounded and polished so as to have a minimum coefficient of friction.

According to preferred embodiments, the gland is in the form of an arrow tip, the end of which is as pointed as possible; the base of the gland forms two shoulders which make it possible to lock the gland under the last loop of the carcass; the base of the gland is wider than the base of the shank. Thus, the only parts of the pin which are in contact with the loops during the penetration of the pin are formed by the widest base of the gland, thus resulting in easy penetration since the friction is reduced only at these places of contact.

Advantageously, therefore, the shank of the pin is made of stainless steel, for example hardened steel, or any other material with a low coefficent to friction. The shank is produced by forging, casting or stamping and then undergoes a finishing treatment by tumbling, to eliminate all the burrs and possible joint-face lines.

To make it easier to understand the subject of the present invention, an embodiment will be described below with reference to the attached drawings in which:

FIG. 4 is a front view of the pin according to the invention, FIG. 5 is a profile view of the pin of FIG. 4.

Figure 1:
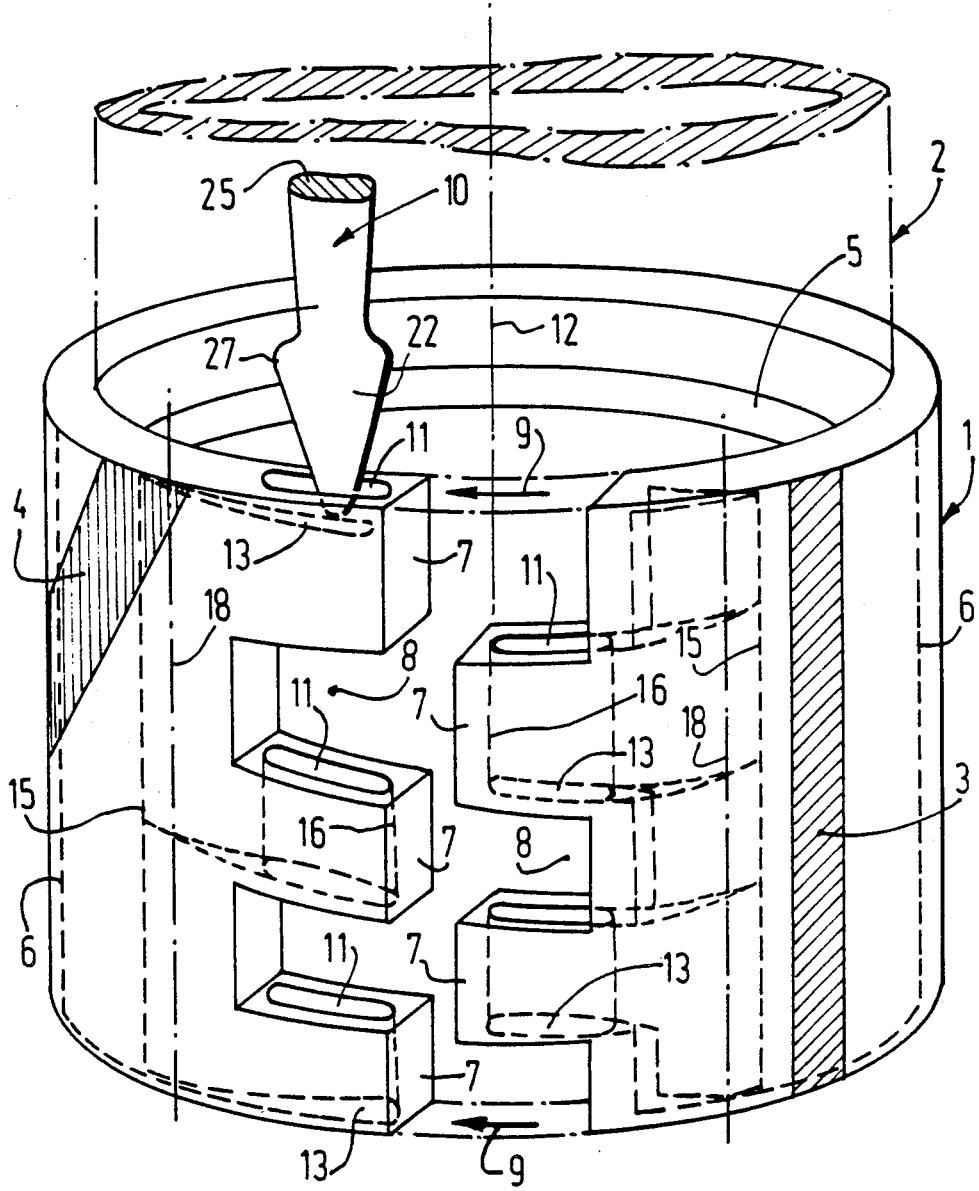
FIG. 1 shows a perspective view of a sleeve, in the upper part of which the pin according to the invention, ready to be driven in, is indicated.

By reference to the drawings, it will be seen that 1° denotes as a whole a cylindrical sleeve intended to grip round a tube 2 to be protected or centred.

This sleeve can have a height of the order of 10 to 20 centimeters, depending on its intended use and the diameter of the tube which it is to grip.

Again depending on its intended use, the sleeve 1 can have a smooth outer surface or one with straight longitudinal ribs 3 or helical ribs 4.

In general, the inner surface of the sleeve has transverse ribs, such as 5, intended to assist the engagement of a sleeve 1 on the tube 2.

The sleeve is obtained by moulding from a natural or synthetic rubber. It has a metal carcass 6 embedded in the thickness and bonded in the rubber mass at the time of moulding.

By virtue of its construction, the sleeve has, over its entire height, a crenellated cut, of which the teeth 7 and spaces 8 facing one another alternately on the two edges of the cut match one another so that, as a result of the interpenetration of the teeth in the spaces, the sleeve can be closed, as indicated by the arrow 9, and clamped over the tube 2.

So that this clamping is effective, the inside diameter of the sleeve 1 is slightly less than the outside diameter of the tube 2, the elasticity of the rubber of the sleeve making it possible to recover the few tenths of a millimeter necessary to bring the ends of the teeth 7 completely in the bottoms of the spaces 8.

Clamping is maintained by means of a pin 10 which is driven into slots 11 made in teeth 7 and extending over the entire height of the latter, in a direction parallel to the axis 12 of the sleeve and to the general direction of the cut.

During use, the sleeve is subjected to very high forces, especially torsional forces. To give it maximum strength, its metal carcass 6 has been shaped so that it extends into each tooth 7, to form there a loop 13 which extends substantially over the entire height of the tooth and the aperture of which matches the contour of the slot 11 corresponding to it.

Figure 2:
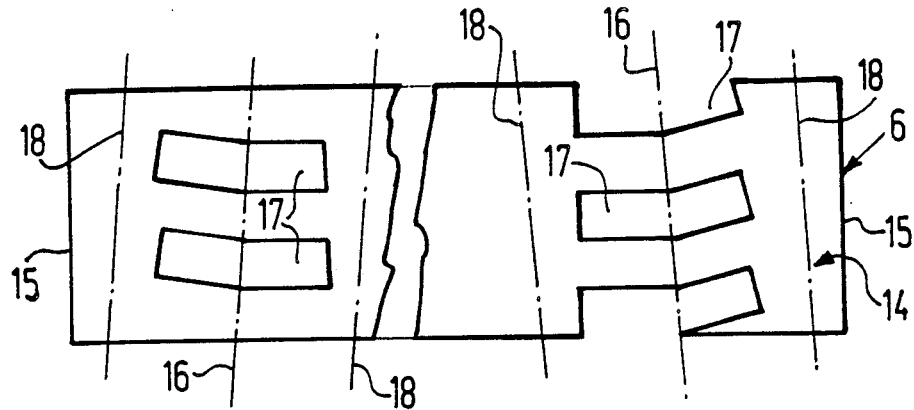
FIG. 2 shows a plan view of a sheet intended for forming the carcass of the sleeve of FIG. 1, before folding and riveting.

A conventional method of producing a metal carcass has been shown in FIG. 2. The starting piont is a plane sheet 14, in which slots 17 are cut out in positions corresponding to the spaces 8 of the sleeve to be moulded. The sheet 14 is subsequently folded on itself along each of its two short sides 15, so that the line 16 passing substantially through the centres of the cuts 17 forms the new transverse end of the carcass. The loops 13 formed in this way are subsequently fixed by means of welds or rivets along the line 18.

Figure 3:
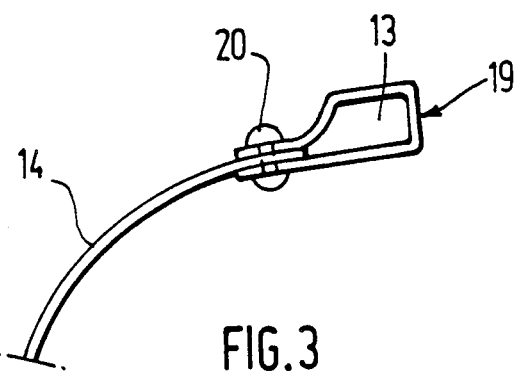
FIG. 3 shows a clasp which can serve as an end loop for the metal carcass of the sleeve of FIG. 1.

In the alternative embodiment shown in FIG. 3, each edge of the sheet 14 receives as many clasps 19 as there are loops to be formed, and each clasp 19, already shaped in the form of a loop, is riveted at 20.

If the pin 10 is parallelipipedic or cylindrical, the two folds along the line 16 are made parallel to the edges 15.

In the alternative form with clasps, these are of identical shape and are riveted along a line parallel to the edges 15.

In contrast to this, if a frustoconical or trapezoidal pin 10 is used, the folds along the line 16 are made with a slight inclination relative to the edges 15, so that subsequently, in the moulded sleeve, the lines defined by the ends of the loops 13 form with the axis 12 an angle equal to that formed by the edge of the pin with its longitudinal axis of symmetry. The riveting or welding line 18 is then itself inclined slightly relative to the edges 15, as can be seen in FIG. 2.

In the alternative form with clasps, these are riveted to the sheet 14, so that the ends of the loops 13 form a line which is again inclined at an angle equal to that formed by the longitudinal edge of the frustoconical or trapezoidal pin 10 with the axis of symmetry.

Figure 6:
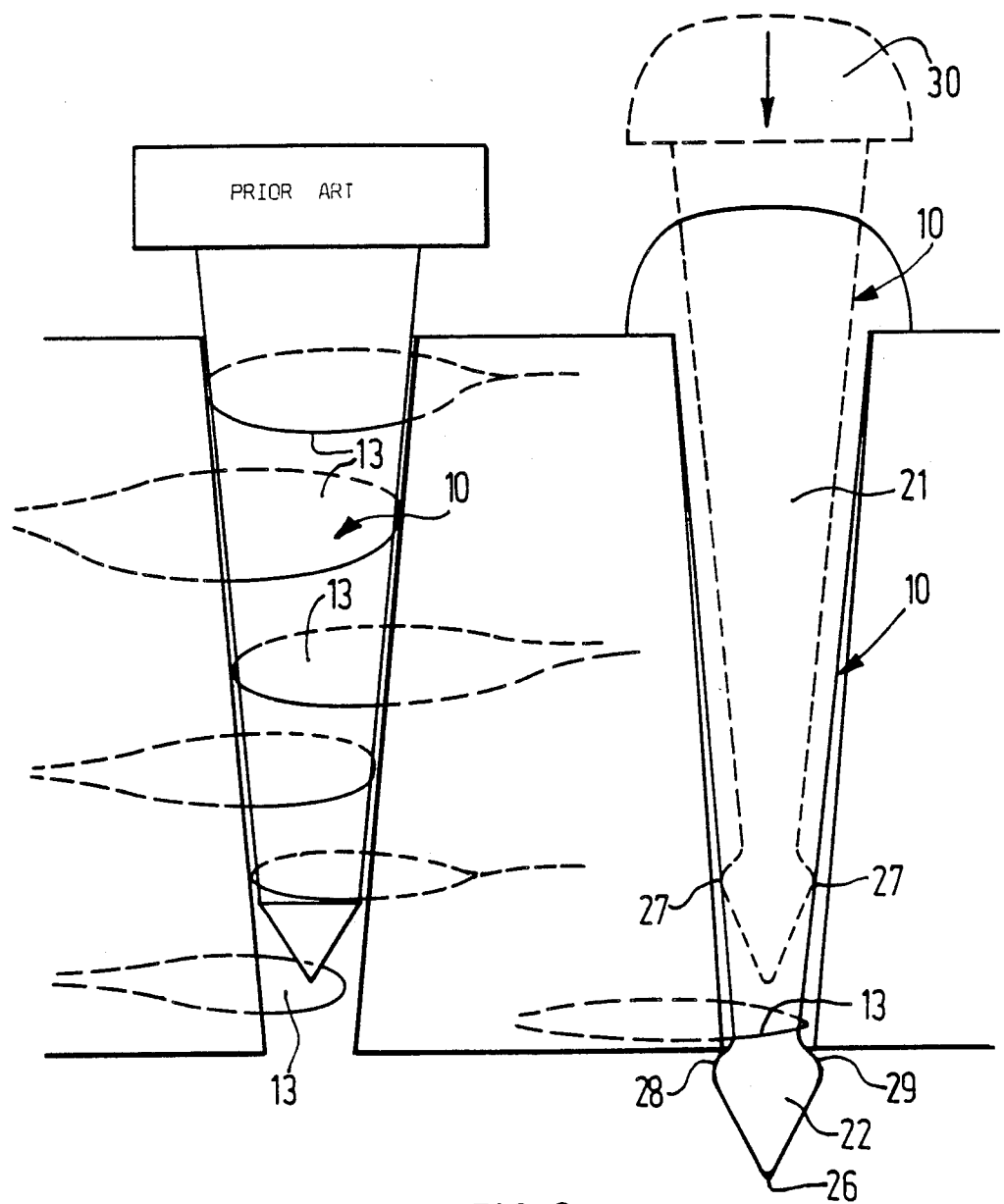
FIG. 6 shows diagrammatically the methods of driving two pins into the loops of the carcass, a conventional trapezoidal pin and the pin according to the invention respectively.

From the foregoing description and with reference to the left-hand part of FIG. 6, it will be appreciated that it is extremely difficult to drive in the pin 10 after the edges of the cut have been brought close to one another, since the pin edges as a whole and, moreover, the front and rear faces of the pin rub against the loops 13.

According to the invention, the pin 10 is of a type with a trapezoidal shank 21. This shank is characterized in that the point of the shank has a gland 22, and in that the edges 23 and 24 of the shank, on and at the rear of the gland, are rounded and polished, so as to have a minimum coefficient of friction. In crosssection, therefore, the pin has the oblong shape 25 which can be seen in FIGS. 1 and 4. The thickness of this pin is constant, as shown in FIG. 5.

The gland 22 is shaped in the form of an arrow tip, the end 26 of which is as pointed as possible.

The base 27 of the gland 22 is clearly wider than the shank, at least over the lower third of the latter, and indeed wider than the base of the shank.

The advantage of this shape is that it makes it possible to bring the two edges of the sleeve progressively closer to one another with minimum force, first because the only places of contact between the pin and the sleeve are at the base of the gland, and also because there is minimum friction as result of the surface state of the edges of the pin and the material forming the latter.

To assist sliding even further, the pin is made of stainless steel, for example hardened steel, or any other material with a low coefficient of friction, such as a special chrome steel or even a chrome/molybdenum steel.

In contrast to the conventional pins which are cut out, the pin according to the invention is produced by forging, casting or stamping so that its edges are as polished as possible. In addition, the pin will undergo a finishing treatment by tumbling, to eliminate all the burrs and possible joint-face lines. The end 26 of the gland 22 has been forged or moulded to a point and the radius which appears at the end in FIG. 4 and 5 is merely the result of tumbling.

By virtue of the construction, the base 27 of the gland forms two shoulders 28 and 29 which make it possible to lock the gland under the last loop 13 of the carcass, as shown in FIG. 6 in the right-hand part, to obtain the final position of the pin 10.

The advantage of this shape and of this arrangement is that, at the end of clamping, the pin is definitely secured more effectively, and it is therefore impossible to eject it accidently.

To make it possible for the pin to penetrate, the base of its shank is extended by a head 30 which is thicker and wider than the shank, this head being perforated substantially at its centre with an orifice 31 which makes it possible, by means of a tool, to manipulate the pin during penetration by pushing it or to eject it by pulling it.

To prevent the head of the pin from being caught in the ground or in a casing during the rotation of the tube protected by a sleeve clamped by the pin according to the invention, the front faces of its head and of its shank, 32 and 33 respectively, are coplanar. Moreover, the flanks 34 and the top 35 of the rear part of the head projecting beyond the rear face of the shank, and the flanks 36 and the top 37 of the front part of the head, are rounded and concave towards the rear, that is to say towards the tube 2 to be protected.

To make it possible to release the pin, the edges 28 and 29 connecting the base of the gland to the shank are symmetrical, converge towards the base of the shank and are inclined relative to the longitudinal axis of symmetry 38 of the pin at an angle of between 75° and 85°.

Since the advantage of the pin is that it makes it possible to bring the two edges of the sleeve progressively closer to one another with minimum force, it is clear that there is no longer any need for the pre-clamping operation required with conventional pins. It is consequently no longer necessary to modify the metal carcass 6 or the outer shape of the sleeve 1, thus ensuring a saving in terms of production of the order of 15 to 20%.

The invention is, of course, not limited to the uses or to the embodiment mentioned, and various alternative forms are possible, without thereby departing from the scope of the present invention.

I claim:

1. Pin, especially for clamping a sleeveshaped protector on a tube serving for drilling or production in an underground deposit, the said sleeve being moulded from rubber and having, over its entire height, a crenellated cut, of which the teeth and spaces facing one another alternately on the two edges of the cut match one another so that, as result of the interpenetration of the teeth in the spaces, the sleeve can be closed and clamped on the tube to be protected, the said sleeve being of the type with an embedded metal carcass which terminates, in each tooth of the sleeve, in a loop which extends over the entire height of the tooth and the aperture of which is parallel to the axis of the sleeve and to the general direction of the cut, and the pin, to clamp the sleeve by penetrating all the loops of the carcass which are present on the two edges of the protector brought close to one another, being of the type with a trapezoidal shank and being characterized in that the point of the shank has a gland in the form of an arrow tip having a base wider than the adjacent shank, and in that the edges of the shank on and at the rear of the gland are rounded and polished so as to have a minimum coefficient of friction.

2. Pin according to claim 1, characterized in that the end of the arrow tip is as pointed as possible.

3. Pin according to claim 1, characterized in that its shank is made of stainless steel, for example hardened steel, or any other material with a low coefficient of friction.

4. Pin according to any one of claim 3, characterized in that its shank is produced by forging, casting or stamping and then undergoes a finishing treatment by tumbling to eliminate all the burrs and the possible joint-face lines.

5. Pin according to claim 1, characterized in that the edges connecting the base of the gland to the shank are symmetrical, converge towards the base of the shank and are inclined relative to the longitudinal axis of symmetry of the pin at an angle of between 75° and 85°.

6. Pin according to claim 1, characterized in that the remote end of the shank is extended by a head which is thicker and wider than the said shank so as to form lateral flanks, this head being perforated substantially at its centre with an orifice which makes it possible, by means of a tool, to manipulate the pin when it is driven in and when it is released.

7. Pin according to claim 6, characterized in that the front faces of its head and of its shank are coplanar, and in that the flanks and the top of the rear part of the head projecting beyond the rear face of the shank, and the flanks and the top of the front part of the head, are rounded and concave towards the rear.

8. Pin according to claim 1 wherein the shank and the gland are symmetrical about the longitudinal axis of the pin.

* * * * *